US012511711B2

(12) United States Patent
Zheng et al.

(10) Patent No.: US 12,511,711 B2
(45) Date of Patent: Dec. 30, 2025

(54) IMAGE RESCALING

(71) Applicant: Microsoft Technology Licensing, LLC, Redmond, WA (US)

(72) Inventors: Shuxin Zheng, Redmond, WA (US); Chang Liu, Redmond, WA (US); Di He, Redmond, WA (US); Guolin Ke, Redmond, WA (US); Yatao Li, Beijing (CN); Jiang Bian, Redmond, WA (US); Tieyan Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 17/802,775

(22) PCT Filed: Feb. 21, 2021

(86) PCT No.: PCT/US2021/018950
§ 371 (c)(1),
(2) Date: Aug. 26, 2022

(87) PCT Pub. No.: WO2021/188254
PCT Pub. Date: Sep. 23, 2021

(65) Prior Publication Data
US 2023/0093734 A1     Mar. 23, 2023

(30) Foreign Application Priority Data

Mar. 20, 2020    (CN) .......................... 202010203650.1

(51) Int. Cl.
*G06T 3/4046*     (2024.01)
*G06T 3/4084*     (2024.01)
(52) U.S. Cl.
CPC .......... *G06T 3/4046* (2013.01); *G06T 3/4084* (2013.01)

(58) Field of Classification Search
CPC ....... G06T 3/4046; G06T 3/4084; G06T 1/20; G06T 3/4023; G06T 3/4076;
(Continued)

(56) References Cited

U.S. PATENT DOCUMENTS 6,026,178 A     2/2000   Toda
2018/0075581 A1   3/2018   Shi et al.

FOREIGN PATENT DOCUMENTS

CN        110310227 A    10/2019
JP         2018195069 A   12/2018
(Continued)

OTHER PUBLICATIONS

Kim, Heewon, et al. "Task-aware image downscaling." Proceedings of the European conference on computer vision (ECCV). 2018. (Year: 2018).*

(Continued)

*Primary Examiner* — Amandeep Saini
*Assistant Examiner* — Denise G Alfonso
(74) *Attorney, Agent, or Firm* — Schwegman Lundberg & Woessner, P.A.

(57) ABSTRACT

According to implementations of the subject matter described herein, a solution for image rescaling is proposed. According to the solution, an input image of a first resolution is obtained. An output image of a second resolution and high-frequency information following a predetermined distribution are generated based on the input image by using a trained invertible neural network, where the first resolution exceeds the second resolution. Besides, a further input image of the second resolution is obtained. A further output image of the first resolution is generated based on the further input image and high-frequency information following the predetermined distribution by using an inverse network of the invertible neural network. This solution can downscale (Continued)

an original image into a visually-pleasing low-resolution image with the same semantics and also can reconstruct a high-resolution image of high quality from a low-resolution image.

11 Claims, 9 Drawing Sheets

(58) Field of Classification Search
CPC . G06T 2207/20081; G06T 2207/20084; G06T 3/4007; G06T 2207/20064
See application file for complete search history.

(56) References Cited

FOREIGN PATENT DOCUMENTS

| KR | 20180097342 A | 8/2018 |
|---|---|---|
| KR | 20200004427 A | 1/2020 |

OTHER PUBLICATIONS

Li, Zhuangzi, et al. "Multi-scale invertible network for image super-resolution." Proceedings of the 1st ACM International Conference on Multimedia in Asia. 2019. (Year: 2019).*
First Office Action Received for Chinese Application No. 202010203650.1, mailed on Jun. 24, 2024, 12 pages. (English Translation Provided).
"Video Super Resolution", Retrieved From: https://fosterelli.co/file/talk/video-super-resolution.pdf, Retrieved On: Oct. 24, 2019, 38 Pages.
Ardizzone, et al., "Analyzing Inverse Problems with Invertible Neural Networks", In Repository of arXiv:1808.04730v3, Feb. 6, 2019, 20 Pages.
Ardizzone, et al., "Guided Image Generation with Conditional Invertible Neural Networks", In Repository of arXiv:1907.02392v1, Jul. 4, 2019, 11 Pages.
Asim, et al., "Invertible Generative Models for Inverse Problems: Mitigating Representation Error and Dataset Bias", In Repository of arXiv:1905.11672v1, May 28, 2019, 52 Pages.
Donahue, et al., "Semantically Decomposing the Latent Spaces of Generative Adversarial Networks", In Repository of arXiv:1705.07904v1, May 22, 2017, 17 Pages.
Jacobsen, et al., "i-RevNet: Deep Invertible Networks", In Repository of arXiv:1802.07088v1, Feb. 20, 2018, 11 Pages.
Kim, et al., "Task-Aware Image Downscaling", In Proceedings of the 15th European Conference on Computer Vision, Sep. 8, 2018, 16 Pages.
Lucas, et al., "Using Deep Neural Networks for Inverse Problems in Imaging: Beyond Analytical Methods", In Journal of IEEE Signal Processing Magazine, vol. 35, No. 1, Jan. 10, 2018, pp. 20-36.
"International Search Report and Written Opinion Issued in PCT Application No. PCT/US21/018950", Mailed Date: May 21, 2021, 12 Pages.
Shen, et al., "Towards Learning a Self-inverse Network for Bidirectional Image-to-image Translation", In Repository of arXiv:1909.04104v1, Sep. 9, 2019, 10 Pages.
Yang, et al., "Adversarial Neural Network Inversion via Auxiliary Knowledge Alignment", In Repository of arXiv:1902.08552v1, Feb. 22, 2019, 16 Pages.
Ardizzone, et al.," Analyzing Inverse Problems With Invertible Neural Networks", ICLR, arXiv:1808.04730v3 [cs.LG], Feb. 6, 2019, 20 pages.
Decision to Grant Received for Japanese Application No. 2022548582, mailed on Jan. 6, 2025, 5 pages.
Kim, et al., "Task-Aware Image Downscaling", European Conference on Computer Vision, 2018, 16 pages.
Lucas, et al., "Using Deep Neural Networks for Inverse Problems in Imaging: Beyond Analytical Methods", IEEE, vol. 35, No. 1, Jan. 10, 2018, pp. 20-36.
Notice of Preliminary Rejection Issued in Korean Application No. 10-2022-7033277, mailed on Dec. 31, 2024, 08 Pages. (English Translation Provided).
Li, et al., "Multi-Scale Invertible Network for Image Super-Resolution", Proceedings of the 1st ACM International Conference on Multimedia in Asia, Jan. 10, 2020, 6 pages.
Second Office Action received for Chinese Application No. 202010203650.1, mailed on Feb. 26, 2025, 11 pages. (English Translation Provided).
First Examination report Received for Indian Application No. 202217052107, mailed on May 19, 2025, 7 pages.
Third Office Action Received for Chinese Application No. 202010203650.1, mailed on Jul. 30, 2025, 11 pages. (English Translation Provided).
Notice of Allowance Issued in Korean Application No. 10-2022-7033277, mailed on Oct. 30, 2025, 04 Pages. (English Translation Provided).

* cited by examiner

IMAGE RESCALING

This application is a U.S. National Stage Filing under 35 U.S.C. 371 of International Patent Application Serial No. PCT/US2021/018950, filed Feb. 21, 2021, and published as WO 2021/188254 A1 on Sep. 23, 2021, which application claims the benefit of priority to Chinese Patent Application No. 202010203650.1, filed Mar. 20, 2020, which applications and publication are incorporated herein by reference in their entirety.

BACKGROUND

Image rescaling has become one of the most common operations for digital image processing. On one hand, with exploding amounts of high-resolution (HR) images/videos on the Internet, image downscaling is quite indispensable for storing, transferring and sharing such large-size data, since the downscaled counterpart can significantly save the storage and efficiently utilize the bandwidth while maintaining the same semantic information. On the other hand, many of these downscaling scenarios inevitably raise a great demand to the inverse task, i.e., up-scaling the downscaled image to its original size.

Conventional image downscaling (i.e., downscaling a high-resolution image to a low-resolution image) schemes usually lead to loss of high-frequency information in the high-resolution image. Because of the loss of the high-frequency information, conventional image up-scaling (i.e., up-scaling a low-resolution image to a high-resolution image) schemes often fail to reconstruct a high-resolution image of high quality from a low-resolution image.

SUMMARY

According to implementations of the subject matter described herein, a solution for image rescaling is proposed. According to the solution, an input image of a first resolution is obtained. An output image of a second resolution and high-frequency information following a predetermined distribution are generated based on the input image by using a trained invertible neural network, where the first resolution exceeds the second resolution and the input image and the output image have the same semantics. Besides, a further input image of a second resolution is obtained. A further output image of a first resolution is generated based on the further input image and high-frequency information following a predetermined distribution by using an inverse network of the invertible neural network, where the further input image and the further output image have the same semantics. This solution can downscale an original image into a visually-pleasing low-resolution image with same semantics and also can reconstruct a high-resolution image of high quality from the low-resolution image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

Figure 1A:
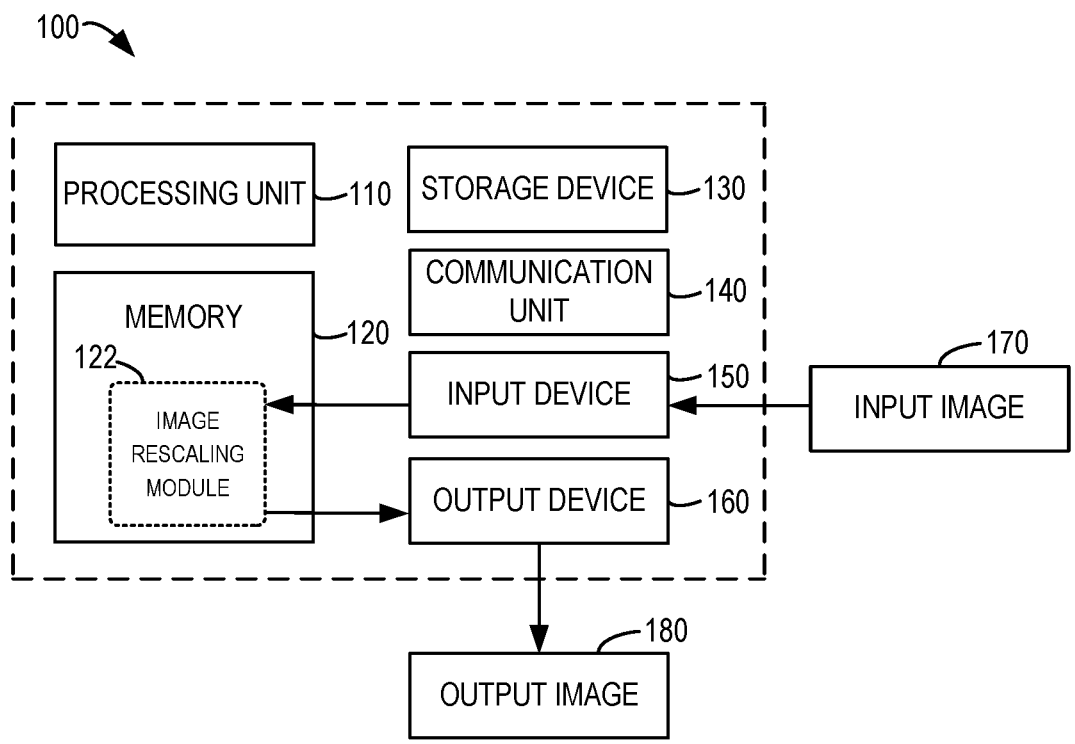
FIG. 1A illustrates a schematic block diagram of a computing device which can implement a plurality of implementations of the subject matter described herein.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, a "neural network" can handle inputs and provide corresponding outputs, which usually includes an input layer, an output layer and one or more hidden layers between the input and output layers. Respective layers of the neural network are connected in sequence, such that an output of a preceding layer is provided as an input for a following layer, where the input layer receives the input of the neural network model while the output of the output layer acts as the final output of the neural network model. Each layer of the neural network model includes one or more nodes (also known as processing nodes or neurons) and each node processes the input from the preceding layer. In the text, the terms "neural network," "model," "network" and "neural network model" may be used interchangeably.

As described above, image rescaling is one of the most common operations for digital image processing. However, conventional image downscaling (i.e., downscaling a high-resolution image to a low-resolution image) schemes usually lead to loss of high-frequency information in the high-resolution image. The loss of the high-frequency information also makes an image up-scaling procedure (i.e., up-scaling a low-resolution image to a high-resolution image) quite challenging because it means that a same low-resolution (LR) image may correspond to a plurality of high-resolution (HR) images (also known as ill-posedness in the image up-scaling procedure). Accordingly, the conventional schemes usually fail to reconstruct a HR image of high quality from an LR image.

Conventional schemes usually up-scales an LR image with a super resolution (SR) method. Existing SR methods mainly focus on learning prior information by example-based strategies or deep-learning models. Apparently, if the target LR image is obtained by downscaling a corresponding HR image, considering the image downscaling method during the image up-scaling procedure will help improve the quality of HR image reconstruction.

Conventional image downscaling methods employ frequency-based kernels (such as bilinear interpolation and bicubic interpolation) as low-pass filters to sub-sample the input HR image into the target resolution. However, since the high-frequency information is suppressed, the above methods often result in over-smoothed images. Recently, several detail-preserving or structurally similar downscaling methods are proposed. However, those perceptual-oriented downscaling methods never consider potential mutual reinforcement between image downscaling and its inverse task (i.e., image up-scaling).

Inspired by the potential mutual reinforcement between image downscaling and its inverse task (i.e., image up-scaling), some conventional schemes try to model the image downscaling and the image up-scaling into a united task. For example, some schemes provide an image downscaling model based on an auto-encoder framework, in which an encoder and a decoder respectively serve as image downscaling and SR models, such that the image downscaling and up-scaling procedures are jointly trained as a unified task. Some schemes estimate a downscaled low-resolution image using a convolutional neural network and utilize a learnt or specified SR model for HR image reconstruction. Some schemes further propose a content-adaptive-sampler based image downscaling method, which can be jointly trained with any existing SR models. Although the above schemes may improve the quality of the HR image restored from the downscaled LR image to some extent, they cannot fundamentally solve the ill-posed issue of the image up-scaling procedure and thus fail to reconstruct a high-quality HR image from the LR image.

In accordance with implementations of the subject matter described herein, there is provided a solution for image rescaling. In this solution, an input image of a first resolution is rescaled into an output image of a second resolution by using an invertible neural network. Besides, an inverse network of the neural network can rescale an input image of a second resolution into an output image of a first resolution. Specifically, during image downscaling, the invertible neural network can convert a HR image into a LR image and a high-frequency noise following a predetermined distribution. During image up-scaling, the inverse network of the invertible neural network can convert a LR image and a random noise following the predetermined distribution into a HR image. Since the invertible neural network is used to model the image downscaling and up-scaling procedures, this solution can downscale an original image into a visually pleasing low-resolution image and greatly alleviate the ill-posed issue of the image up-scaling procedure, such that it can reconstruct a high-resolution image of high quality from a low-resolution image.

Various example implementations of the solution are further described in details below with reference to the drawings.

FIG. 1A illustrates a block diagram of a computing device 100 that can carry out a plurality of implementations of the subject matter described herein. It should be understood that the computing device 100 shown in FIG. 1 is only exemplary and shall not constitute any restrictions over functions and scopes of the implementations described by the subject matter described herein. According to FIG. 1, the computing device 100 includes a computing device 100 in the form of a general purpose computing device. Components of the computing device 100 may include, but be not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof.

The storage device 130 may be a removable or non-removable medium, and may include a machine-readable medium (e.g., a memory, a flash drive, a magnetic disk) or any other medium, which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the subject matter described herein. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 may be used for implementing image rescaling in accordance with various implementations of the subject matter described herein. The memory 120 may include an image rescaling module 122 having one or more program instructions. The module may be accessed and operated by the processing unit 110 to implement functions of the various implementations described herein.

During image rescaling, the computing device 100 may receive, via the input device 150, an input image 170. In some implementations, for example, the input image 170 may be an image of a first resolution. The input image 170 may be input into the image rescaling module 122 in the memory 120. The image rescaling module 122 may generate, based on the input image 170 and using a trained invertible neural network, an output image 180 of a second resolution and high-frequency information following a predetermined distribution, where the first resolution exceeds the second resolution and the input image 170 and the output image 180 have the same semantics. In other implementations, for example, the input image 170 may be an image of the second resolution. The input image 170 may be input into the image rescaling module 122 in the memory 120. The image rescaling module 122 may generate, based on the input image 170 and high-frequency information following the predetermined distribution, an output image 180 of the first resolution using an inverse network of the invertible neural network, where the first resolution exceeds the second resolution and the input image 170 and the output image 180 have the same semantics. The output image 180 may be output via the output device 160.

Figure 1B:
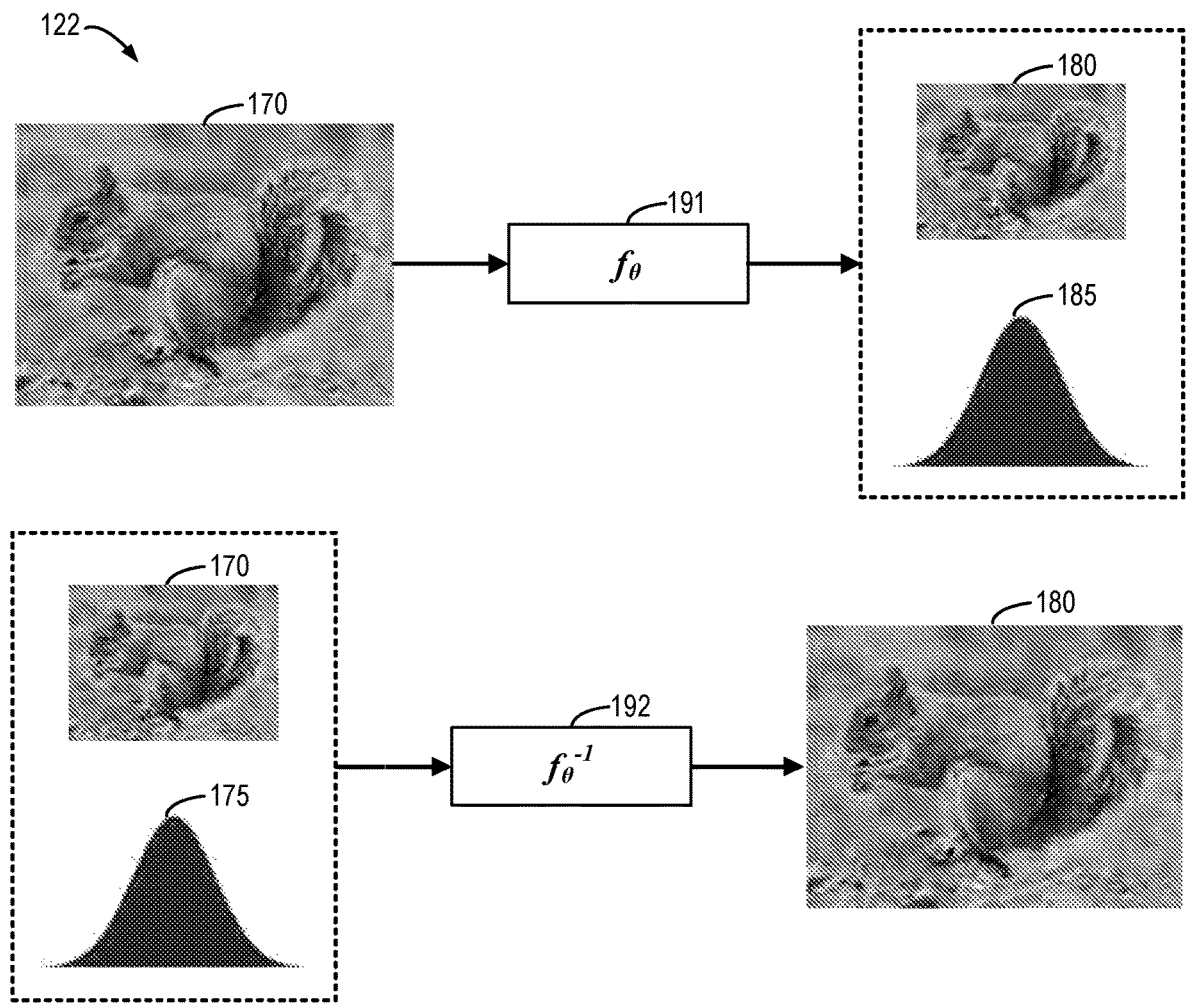
FIG. 1B illustrates a schematic diagram of the working principle of the image rescaling module in accordance with implementations of the subject matter described herein.

In some implementations, the image rescaling module 122 may perform image downscaling (i.e., converting a HR image into a LR image) using a trained invertible neural network and the image rescaling module 122 may perform inverse image up-scaling (i.e., reconstructing a LR image into a HR image) using an inverse network of the invertible neural network. FIG. 1B illustrates a schematic diagram of the working principle of the image rescaling module 122 in accordance with implementations of the subject matter described herein. As shown, the image rescaling module 122 may generate, based on the input image 170 of high resolution and using an invertible neural network 191 (denoted as "$f_\theta$"), the output image 180 of low resolution and high-frequency information 185 following the predetermined distribution. For example, the high-frequency information 185 may be embodied as a high-frequency noise independent of the semantics of the input image 170. The image rescaling module 122 may generate, based on the input image 170 of low resolution and high-frequency information 175 following a predetermined distribution, the output image 180 of high resolution using an inverse network 192 (indicated as "$f_\theta^{-1}$") of the invertible neural network 191. The "predetermined distribution" as used herein may include, but be not limited to, a Gaussian distribution, a uniform distribution and the like, which may be predefined during the training procedure of the invertible neural network.

Invertible Neural Network (INN) is a popular network structure in the generative model, which may specify a mapping relationship $m=f_\theta(n)$ and its inverse mapping relationship $n=f_\theta^{-1}(m)$. The INN may usually comprise at least one invertible block. For the l-th block, an input $h^l$ is split into $h_1^l$ and $h_2^l$ along the channel axis, and undergo the following affine transformation:

$$h_1^{l+1}=h_1^l+\phi(h_2^l) \tag{1}$$

$$h_2^{l+1}=h_2^l \odot \exp(\rho(h_1^{l+1}))\eta(h_1^{l+1}) \tag{2}$$

and the corresponding output is $[h_1^{l+1}, h_2^{l+1}]$. Given the output, its inverse transformation may be computed as follows:

$$h_2^l=(h_2^{l+1}-\eta(h_1^{l+1})) \odot \exp(-\rho(h_1^{l+1})) \tag{3}$$

$$h_1^l=h_1^{l+1}-\phi(h_2^l) \tag{4}$$

where $\varphi$, $\rho$ and $\eta$ may be any functions and $\odot$ represents a convolution operation.

When the INN is applied to the image rescaling task, the INN can output, based on an input image x of high resolution, a downscaled low-resolution image y as well as high-frequency information z following a predetermined distribution, where the high-frequency information z for example may be embodied as a high-frequency noise independent of the semantics of the image. In this way, the inverse network of the INN can reconstruct the high resolution image x of high quality based on the low-resolution image y and the noise z. In other words, it is usually required to maintain the high-frequency information z lost in the image downscaling procedure to make the image rescaling procedure invertible. Besides, the whole image rescaling procedure may be represented by mapping relationships $(y,z)=f_\theta(x)$ and $x=f_\theta^{-1}(y,z)$.

However, during image up-scaling, it is usually required to up-scale any LR image. Therefore, the high-frequency information z corresponding to the input LR image is often absent. The inventor noticed that the information lost in the image downscaling procedure is equivalent to high-frequency details according to the Nyquist-Shannon sampling theory. Assuming that a group of HR images corresponding to the same LR image include different high-frequency details, these details can usually demonstrate a certain degree of variability and randomness. Therefore, z may be represented as a random variable and its distribution is decided by the way in which the INN represents z (i.e., the way $f_\theta$ outputs z). Specifically, the INN can be trained to satisfy the predetermined distribution p(z). In this way, it is unnecessary to save the high-frequency noise z output by the invertible neural network during the image downscaling procedure. In addition, during the image up-scaling procedure, a high resolution image can be reconstructed based on a low resolution image and any one sample under the predetermined distribution.

Figure 2A:
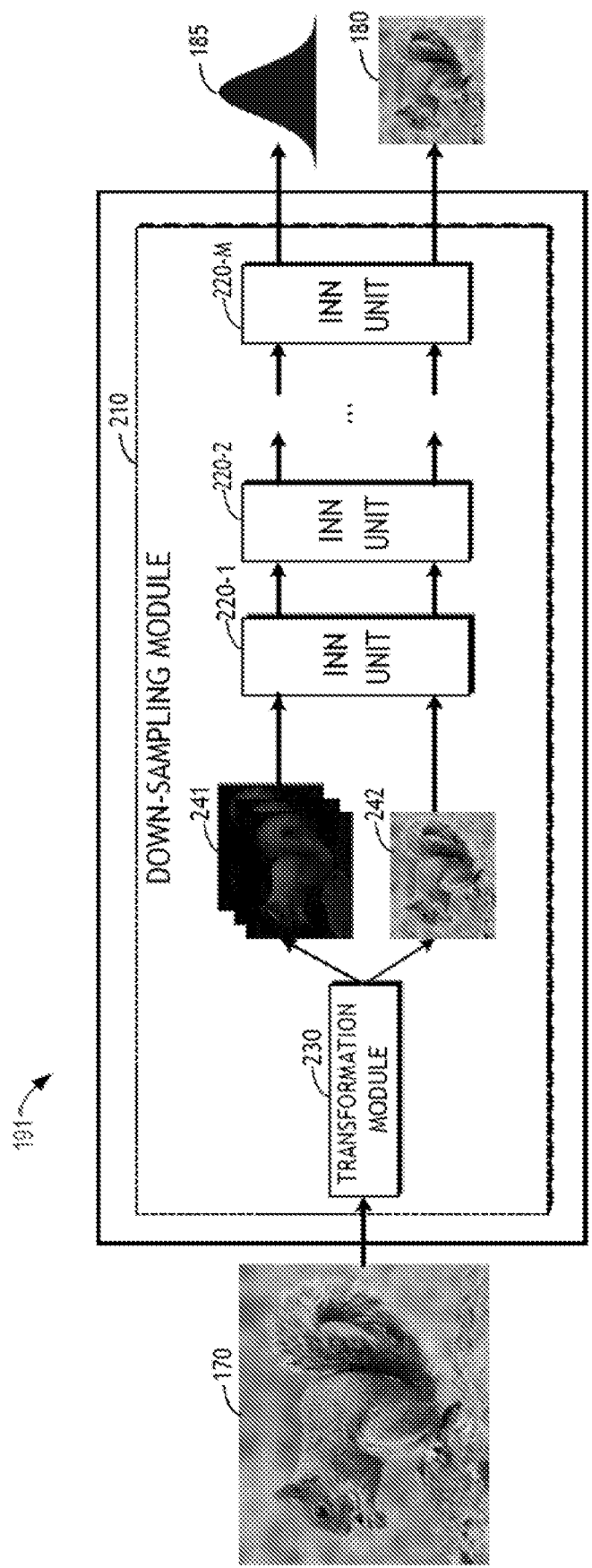
FIG. 2A illustrates a schematic block diagram of an invertible neural network in accordance with implementations of the subject matter described herein.

FIG. 2A illustrates a schematic block diagram of the invertible neural network 191 in accordance with implementations of the subject matter described herein. It should be appreciated that the structure of the invertible neural network 191 shown in FIG. 2A is exemplary only, without suggesting any limitation as to the scope of the subject matter described herein. Implementations of the subject matter described herein are also suitable for an invertible neural network with a different structure.

As shown in FIG. 2A, the invertible neural network 19 may be formed by connecting one or more down-sampling modules 210 in series. For the purpose of simplification, only one down-sampling module 210 is shown in FIG. 2A. The image downscaling ratio supported by the invertible neural network 191 may be determined by the image downscaling ratio supported by each down-sampling module 210 and the number of down-sampling modules 210 included in the invertible neural network 191. For example, assuming that each down-sampling module 210 supports reducing the image by a factor of 2 and the invertible neural network 191 includes two down-sampling modules 210, the invertible neural network 191 supports reducing the image by a factor of 4.

As shown in FIG. 2A, for example, the down-sampling module 210 may include a transformation module 230 and one or more INN units 220-1, 220-2 . . . 220-M (collectively known as "INN units 220" or individually known as "INN unit 220," where M≥1).

The transformation module 230 may decompose the input image 170 of high resolution into a low-frequency component 242 representing semantics of the input image 170 and a high-frequency component 241 related to the semantics. In some implementations, the transformation module 230 may be implemented as a wavelet transformation module, e.g., a Haar transformation module. For example, when the transformation module 230 is implemented as a Haar transformation module, the down-sampling module 210 may support reducing the image by a factor of 2. Specifically, the Haar transformation module may convert an input image or a group of feature maps with a length H, a width W and a channel number C into an output tensor (½H, ½W, 4C) A first C slice of the output tensor may be approximately a low pass representation equivalent to the bilinear interpolation down-sampling. The remaining three groups of C slices contain residual components in the vertical, horizontal and diagonal directions respectively. These residual components are based on high-frequency information in the original HR image. Alternatively, the transformation module 230 may also be implemented as a 1×1 invertible convolution block or as any transformation module currently known or to be developed in the future which can decompose the input image 170 into a low-frequency component and a high-frequency component. It is to be understood that implementations of the transformation module 230 may be different if the image downscaling ratio supported by the down-sampling module 210 changes. In this way, the low-frequency information 242 and the high-frequency information 241 may be fed to a subsequent INN unit 220-1.

As described above, the structure of each INN unit 220 should be invertible, so as to ensure that the network structure of the neural network 191 is invertible. The INN unit 220 is used to extract corresponding features from the input low-frequency component and high-frequency component, and to convert the high-frequency component related to the image semantics into high-frequency information, which follows the predetermined distribution and is independent of the image semantics.

Figure 2B:
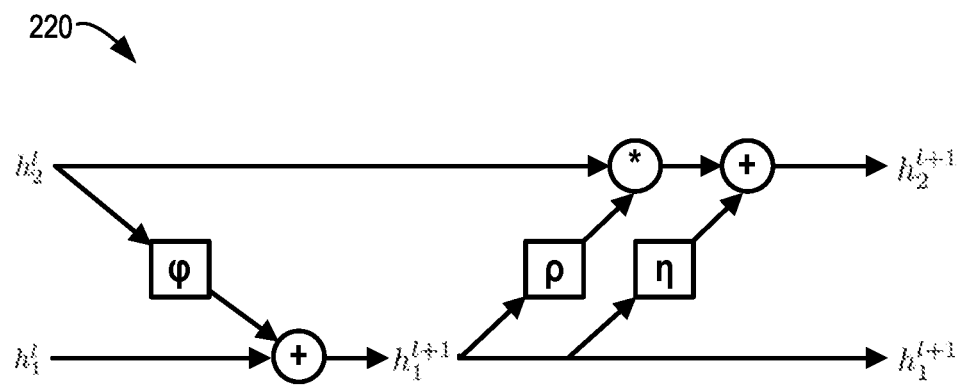
FIG. 2B illustrates a schematic diagram of an example invertible neural network unit in accordance with implementations of the subject matter described herein.

FIG. 2B illustrates a schematic diagram of an example INN unit 220 in accordance with implementations of the subject matter described herein. Here, it is assumed that the low-frequency component and the high-frequency component input into the INN unit 220 are represented as $h_1^l$ and $h_2^l$ respectively. As shown in FIG. 2B, the affine transformation shown in the above formula (1) may be applied to the low-frequency component $h_1^l$ and the affine transformation shown in the above formula (2) may be applied to the high-frequency component $h_2^l$. The transformation functions φ, ρ and η shown in FIG. 2B may be any functions. It should be understood that the INN unit 220 in FIG. 2B is demonstrated only for the purpose of examples, without suggesting any limitation as to the scope of the subject matter described herein. Implementations of the subject matter described herein are also applicable to other INN units with different structures. Examples of the INN unit may include, but be not limited to, invertible convolution blocks, invertible residual network units, invertible generative network units, deep invertible network units and so on.

Figure 3A:
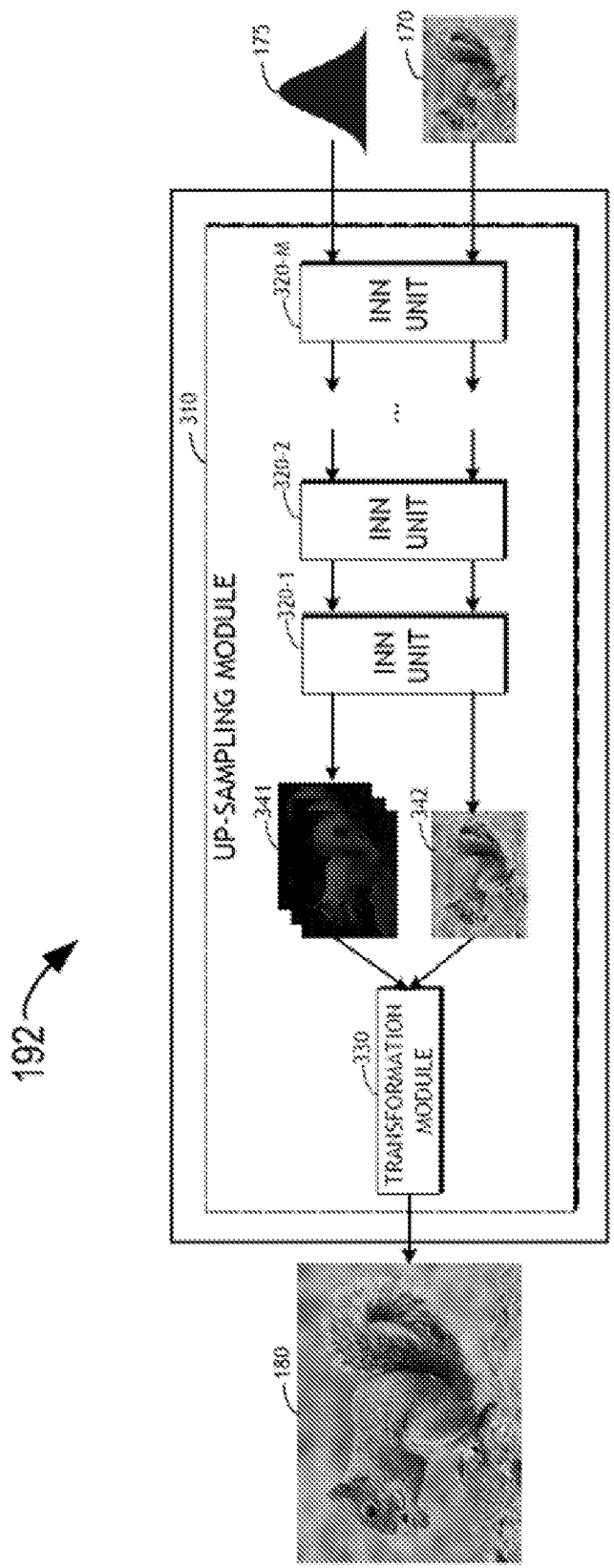
FIG. 3A illustrates a schematic block diagram of an inverse network of the invertible neural network in accordance with implementations of the subject matter described herein.

FIG. 3A illustrates a schematic block diagram of the inverse network 192 of the invertible neural network 191 in FIG. 2A. As shown in FIG. 3A, the network 192 may be formed by connecting one or more upsampling modules 310 in series. For the purpose of simplification, only one up-sampling module 310 is shown in FIG. 3A. The image up-scaling ratio supported by the inverse network 192 may be determined by the image up-scaling ratio supported by each up-sampling module 310 and the number of up-sampling modules 310 included in the inverse network 192. For example, assuming that each up-sampling module 310 supports enlarging the image by 2 times and the inverse network 192 includes two up-sampling modules 310, the inverse network 192 supports enlarging the image by 4 times.

Figure 3B:
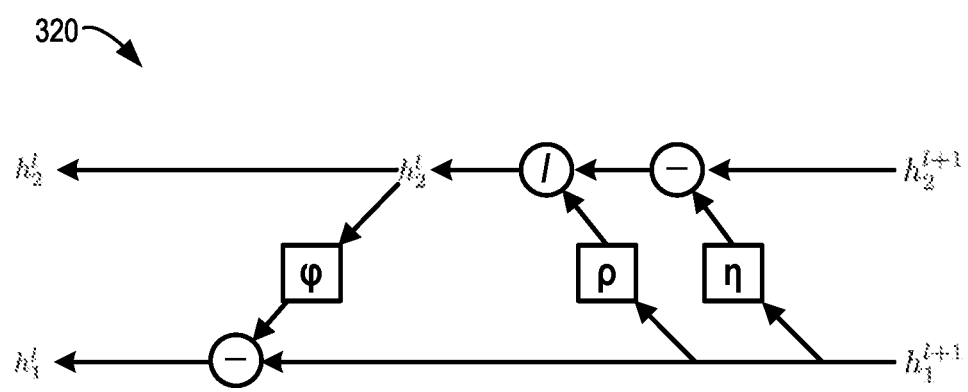
FIG. 3B illustrates a schematic diagram of an example invertible neural network unit in accordance with implementations of the subject matter described herein.

As shown in FIG. 3A, for example, the up-sampling modules 310 may include a transformation module 330 and one or more INN units 320-1, 320-2 ... 320-M (collectively known as "INN units 320" or individually known as "INN unit 320," where M≥1). For example, the structure of the INN unit 320 and the structure of the INN unit 220 in FIG. 2B are invertible to each other as shown in FIG. 3B. For the INN unit 320-M, it is assumed that the input image 170 of low resolution input into the INN unit 320-M is represented as $h_1^{l+1}$ and the high-frequency information 175 following the predetermined distribution is denoted as $h_2^{l+1}$. As shown in FIG. 3B, the affine transformation shown in the above formula (3) may be applied to and the affine transformation shown in the above formula (3) may be applied to. The transformation functions φ, ρ and η in FIG. 3B may be any functions. It should be understood that the INN unit 320 in FIG. 3B is demonstrated only for the purpose of examples, without suggesting any limitation as to the scope of the subject matter described herein. Implementations of the subject matter described herein are also applicable to other INN units with different structures. Examples of the INN unit may include, but be not limited to, invertible convolution blocks, invertible residual network units, invertible generative network units, deep invertible network units and so on.

As shown in FIG. 3A, the one or more INN units 320 may convert the input image 170 of low resolution and the high-frequency information 175 following the predetermined distribution into a high-frequency component 341 and a low-frequency component 342 to be combined. Opposite to the transformation module 230 shown in FIG. 2A, the transformation module 330 may combine the high-frequency component 341 and the low-frequency component 342 into the output image 180 of high resolution. In some implementations, when the transformation module 230 is implemented as a wavelet transformation module, the transformation module 330 may be implemented as an inverse wavelet transformation module. For example, when the transformation module 230 is implemented as a Haar transformation module, the transformation module 330 may be implemented as an inverse Haar transformation module. Alternatively, the transformation module 330 may also be implemented by a 1×1 invertible convolution block or as any transformation module currently known or to be developed in the future which can combine the high-frequency component and the low-frequency component into an image.

The training procedure of the invertible neural network is further described in details below. In the text, the neural network to be trained and its inverse network are collectively known as "model" for the purpose of simplification. According to the above description, it can be seen that the goal for training the model is to determine the mapping relationship $f_\theta$ among the high resolution image x, the low resolution image y and the predetermined distribution p(z).

In order to achieve the training goal, in some implementations, a group of high resolution images $\{x^{(n)}\}_{n=1}^N$ (also known as "first group of training images," where N represents the number of images) and a group of low resolution images having corresponding semantics (also known as "second group of training images") may be acquired as training data to train the model. In some implementations, the second group of training images of low resolution may be generated based on the first group of training images of high resolution. For example, the low-resolution training images having corresponding semantics are generated from the high-resolution training images using an interpolation method or any other suitable method currently known or to be developed in the future. The scope of the subject matter described herein is not limited in this regard. In some implementations, an objective function for training the model may be generated based on the first group of training images and the second group of training images. Then, parameters of the model can be determined by minimizing the objective function.

In some implementations, the objective function for training the model may be determined based on differences between the low-resolution training images and the low-resolution images generated by the model based on the high-resolution training images. For example, with respect to a high-resolution training images $x^{(n)}$ in the first group of training images, assuming that the low-resolution image generated by the model based on the high-resolution training images $x^{(n)}$ is denoted as $f_\theta^y(x^{(n)})$ and the low-resolution training image corresponding to the high-resolution training image $x^{(n)}$ in the second group of training images is represented as $y_{guide}^{(n)}$, the objective function (also) known as "first objective function" or "LR guidance loss function") for training the invertible neural network is generated according to a difference between the low-resolution training images $y_{guide}^{(n)}$ and the low-resolution image $f_\theta^y(x^{(n)})$ generated by the model. For example, the first objective function may be represented as:

$$L_{guide}(\theta) := \sum_{n=1}^{N} \ell_y(y_{guide}^{(n)}, f_\theta^y(x^{(n)})) \quad (4)$$

Where $l_y$ represents a difference metric function, such as, $L_1$ loss function or $L_2$ loss function.

Additionally or alternatively, in some implementations, the objective function for training the model may be determined based on differences between the high-resolution training images and the high-resolution images reconstructed by the model based on the low-resolution images. For example, with respect to the high-resolution training image $x^{(n)}$ in the first group of training images, assuming that the low-resolution image generated by the model based on the high-resolution training image $x^{(n)}$ is denoted as $f_\theta^y(x^{(n)})$ and the high-resolution image reconstructed by the model based the low-resolution image $f_\theta^y(x^{(n)})$ is represented as $f_\theta^{-1}(f_\theta^y(x^{(n)}),z)$, where z follows the predetermined distribution p(z) (i.e., z~p(z)), the objective function (also known as "second objective function" or "HR reconstruction loss function") for training the invertible neural network may be generated according to a difference between the high-resolution training image x(to and the high-resolution reconstructed image $f_\theta^{-1}(f_\theta^y(x^{(n)}),z)$. For example, the second objective function may be represented as:

$$L_{recon}(\theta) := \sum_{n=1}^{N} \mathbb{E}_{p(z)}[\ell_x(x^{(n)}, f_\theta^{-1}(f_\theta^y(x^{(n)}), z))] \quad (5)$$

Where $l_x$ measures the difference between the original high-resolution image and the reconstructed one and $\mathbb{E}_{p(z)}$ indicates the mathematical expectation of $l_x$ when z follows the predetermined distribution p(z).

Additionally or alternatively, another goal of the model training is to encourage the model to catch the data distribution of the high-resolution training images. Here, it is assumed that the data distribution of the first group of training data $\{x^{(n)}\}_{n=1}^N$ is represented as q(x). For example, with respect to a high-resolution training image $x^{(n)}$ in the first group of training images, the high-resolution image reconstructed by the model is denoted as $f_\theta^{-1}(y^{(n)}, z^{(n)})$, where $y^{(n)} := f_\theta^y(x^{(n)})$ indicates a low-resolution image downscaled by the model from the high-resolution training image $x^{(n)}$ and $z^{(n)} \sim \bar{p}(z)$ represents a random variable following the predetermined distribution $p(z)$. A group of downscaled low-resolution images $\{y^{(n)}\}_{n=1}^N$ may be obtained by traversing the first group of training data $\{x^{(n)}\}_{n=1}^N$. The data distribution of $\{y^{(n)}\}_{n=1}^N$ may be denoted as $f_{\theta\#}^y[q(x)]$, which represents the data distribution of the transformed random variable $f_\theta^y(x)$ where the original random variable $x$ follows the data distribution $q(x)$, i.e., $x \sim q(x)$. Similarly, the high-resolution images reconstructed by the model may be denoted as $\{f_\theta^{-1}(y^{(n)}, z^{(n)})\}_{n=1}^N$ and the data distribution thereon may be represented as $f_{\theta\#}^{-1}[f_{\theta\#}^y[q(x)]\,p(z)]$ since $(y^{(n)}, z^{(n)}) \sim f_{\theta\#}^y[q(x)]\,p(z)$. In some implementations, the objective function (also known as "third objective function" or "distribution matching loss function") for training the invertible neural network may be generated according to a difference between the original data distribution $q(x)$ and the model-reconstructed data distribution $f_{\theta\#}^{-1}[f_{\theta\#}^y[q(x)]\,p(z)]$. For example, the third objective function may be represented as:

$$L_{distr}(\theta) := L_p(f_{\theta\#}^{-1}[f_{\theta\#}^y[q(x)]P(z), q(x)) \quad (6)$$

Where $L_p$ measures the difference between the two data distributions.

In some cases, it might be difficult to directly minimize the third objective function shown in the formula (6) since both of the two distributions are high-dimensional and have unknown density functions. In some implementations, the JS divergence can be used for measuring the difference between the two data distributions. That is, the third objective function may also be represented as:

$$L_{distr}(\theta) := JS(f_{\theta\#}^{-1}[f_{\theta\#}^y[q(x)]P(z), q(x)) \quad (7)$$

In some implementations, a total objective function for training the model may be generated by combining the first objective function, the second objective function and the third objective function. For example, the total objective function may be represented as:

$$L_{total} = \lambda_1 L_{recon} + \lambda_2 L_{guide} + \lambda_3 L_{distr} \quad (8)$$

Where $\lambda_1$, $\lambda_2$ and $\lambda_3$ are coefficients for balancing different loss terms.

In some implementations, in order to improve stability of the model training, a pre-training stage may be performed prior to training the model with the total objective function shown in the formula (8). A weakened yet more stable distribution matching loss function may be employed in the pre-training stage. For example, the distribution matching loss function may be built based on a cross entropy loss function to enhance the stability of the model training. For example, the distribution matching loss function (also known as "fourth objective function") built based on a cross entropy (CE) loss function may be represented as:

$$L'_{distr}(\theta) := CE(f_{\theta\#}^z[q(x)], p(z)) = -\mathbb{E}_{f_{\theta\#}^z[q(x)]}[\log p(z)] - \mathbb{E}_{q(x)}[\log p(z = f_\theta^z(x))] \quad (9)$$

where CE represents the cross entropy loss function. Correspondingly, the total objective function used in the pre-training stage may be represented as:

$$L_{IRN} := \lambda_1 L_{recon} + \lambda_2 L_{guide} + \lambda_3 L'_{distr} \quad (10)$$

Where $\lambda_1$, $\lambda_2$ and $\lambda_3$ are coefficients for balancing different loss terms.

In some implementations, after the pre-training stage, a second round of training may be performed again against the model based on the total objective function shown in the formula (8). Alternatively, in some implementations, after the pre-training stage, a second round of training may be performed against the model based on the total objective function shown in the formula (11) as below:

$$L_{IRN+} := \lambda_1 L_{recon} + \lambda_2 L_{guide} + \lambda_3 L_{distr} + \lambda_4 L_{percep} \quad (11)$$

where the perception loss function $L_{percep}$ is provided for measuring the difference of the original high-resolution image and the reconstructed high-resolution image in their semantic features. For example, the semantic features of the original high-resolution image and the reconstructed high-resolution image may be extracted by benchmark models known in the art, which will not be detailed here. $\lambda_1$, $\lambda_2$, $\lambda_3$ and $\lambda_4$ are coefficients for balancing different loss terms.

Figure 4:
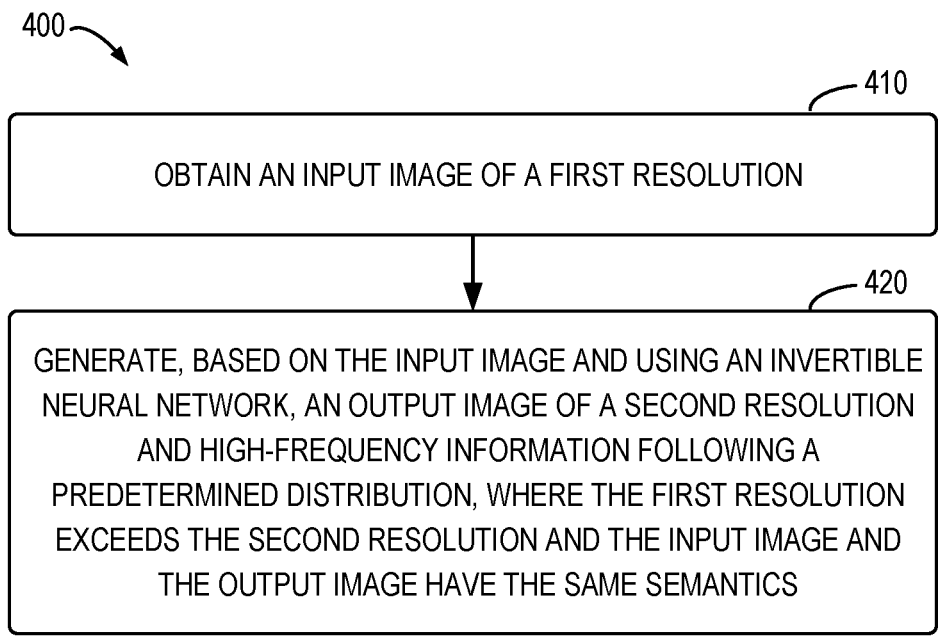
FIG. 4 illustrates a flowchart of an example method for image rescaling in accordance with implementations of the subject matter described herein.

FIG. 4 illustrates a flowchart of a method 400 for image rescaling in accordance with some implementations of the subject matter described herein. The method 400 may be implemented by the computing device 100, for example, at the image rescaling module 122 in the memory 120 of the computing device 100. At block 410, the computing device 100 obtains an input image of a first resolution. At block 420, the computing device 100 generates, based on the input image and using a trained invertible neural network, an output image of a second resolution and high-frequency information following a predetermined distribution, where the first resolution exceeds the second resolution and the input image and the output image have the same semantics.

In some implementations, the invertible neural network comprises a transformation module and at least one invertible network unit, and generating the output image and the high-frequency information comprises: decomposing, using the transformation module, the input image into a low-frequency component representing semantics of the input image and a high-frequency component related to the semantics; and generating, using the at least one invertible network unit, the output image and the high-frequency information independent of the semantics based on the low-frequency component and the high-frequency component.

In some implementations, the transformation module comprises any one of: a wavelet transformation module; and an invertible convolution block.

In some implementations, the method 400 further comprises: training the invertible neural network, wherein: the invertible neural network is trained to generate, based on a first image of the first resolution, a second image of the second resolution and first high-frequency information following the predetermined distribution; and an inverse network of the invertible neural network is trained to generate, based on a third image of the second resolution and second high-frequency information following the predetermined distribution, a fourth image of the first resolution.

In some implementations, training the invertible neural network comprises: obtaining a first group of training images of the first resolution; obtaining a second group of training images of the second resolution respectively corresponding to semantics of the first group of training images; and training the invertible neural network based on the first group of training images and the second group of training images.

In some implementations, obtaining the second group of training images comprises: generating, based on the first group of training images and using an interpolation method, the second group of training images.

In some implementations, training the invertible neural network comprises: determining a plurality of objective functions based on the first group of training images and the second group of training images; determining a total objective function for training the invertible neural network by combining at least a part of the plurality of objective functions; and determining network parameters of the invertible neural network by minimizing the total objective function.

In some implementations, determining the plurality of objective functions comprises: generating, based on the first group of training images and using the invertible neural network, a third group of training images of the second resolution and a group of random variables; and determining, based on differences between the second group of training images and the third group of training images, a first objective function.

In some implementations, determining the plurality of objective functions comprises: generating, based on the first group of training images and using the invertible neural network, a third group of training images of the second resolution and a group of random variables; generating, using the inverse network, a fourth group of training images of the first resolution based on the third group of training images and high-frequency information following the predetermined distribution; and determining, based on differences between the first group of training images and the fourth group of training images, a second objective function.

In some implementations, determining the plurality of objective functions comprises: determining a first data distribution of the first group of training images; determining a second data distribution of the fourth group of training images; and determining, based on a difference between the first data distribution and the second data distribution, a third objective function.

In some implementations, determining the plurality of objective functions comprises: determining a third data distribution of the group of random variables; and determining, based on a difference between the third data distribution and the predetermined distribution, a fourth objective function.

Figure 5:
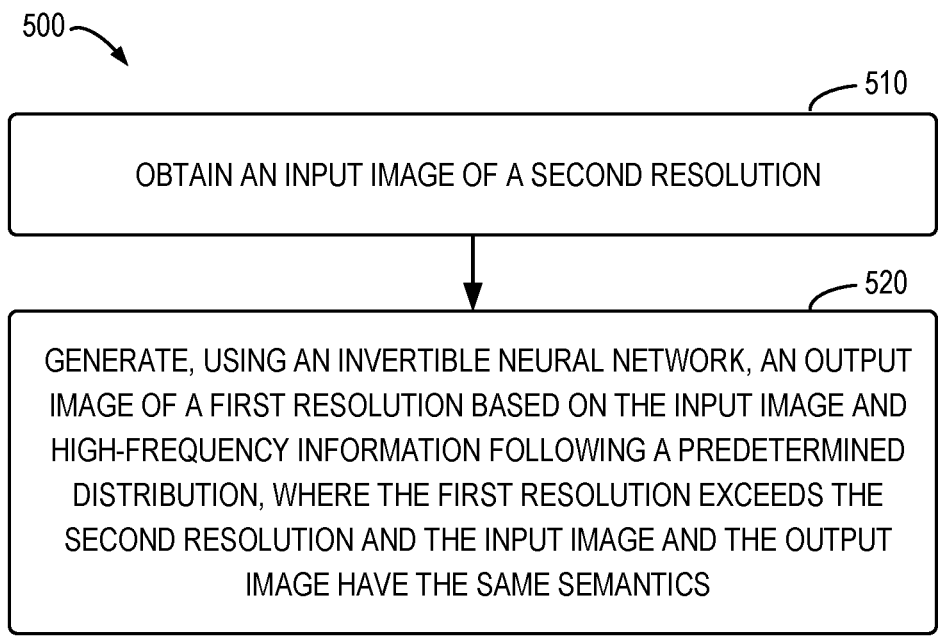
FIG. 5 illustrates a flowchart of an example method for image rescaling in accordance with implementations of the subject matter described herein.

FIG. 5 illustrates a flowchart of a method 500 for image rescaling in accordance with some implementations of the subject matter described herein. The method 500 may be implemented by the computing device 100, for example, at the image rescaling module 122 in the memory 120 of the computing device 100. At block 510, the computing device 100 obtains an input image of a second resolution. At block 520, the computing device 100 generates, using a trained invertible neural network, an output image of a first resolution based on the input image and high-frequency information following a predetermined distribution, where the first resolution exceeds the second resolution and the input image and the output image have the same semantics.

In some implementations, the invertible neural network comprises a transformation module and at least one invertible network unit, and generating the output image comprises: generating, using the at least one invertible network unit, a low-frequency component and a high-frequency component to be combined based on the input image and the high-frequency information, wherein the low-frequency component represents semantics of the input image and the high-frequency component is related to the semantics; and combining, using the transformation module, the low-frequency component and the high-frequency component into the output image.

In some implementations, the transformation module comprises any one of: a wavelet transformation module; and an invertible convolution block.

In view of the above, implementations of the subject matter described herein propose a solution for image rescaling. During image downscaling, an invertible neural network can convert a HR image into a LR image and a high-frequency noise following a predetermined distribution. During image up-scaling, the inverse network of the invertible neural network can convert a LR image and a random noise following the predetermined distribution into a HR image. Since the invertible neural network is used to model the image downscaling and up-scaling procedures, this solution can downscale an original image into a visually pleasing low-resolution image and reconstruct a high-resolution image of high quality from a low-resolution image, thereby greatly alleviating the ill-posed issue of the image up-scaling procedure. Besides, various experimental data also demonstrate that compared with the traditional image rescaling schemes, the implementations of the subject matter described herein can achieve better image reconstruction performance indicators, such as higher Peak Signal-to-Noise Ratio (PSNR) and/or Structure Similarity (SSIM).

Implementations of the subject matter described herein can be widely applied to image and/or video processing fields. For example, online video streaming plays a critical role in our lives, such as video sites, live streaming sites, video streaming mobile applications and so on. High-quality online video streaming is desirable, such as high-resolution videos with rich perceptual details. However, a high-resolution video usually requires a lot of network bandwidth for transmission. Therefore, in order to save the network bandwidth, the high-resolution video is usually processed and compressed before being transmitted to a user client. This will result in a low-resolution video of low quality being presented at the user client. The above issue can be solved by applying the image rescaling solution in accordance with implementations of the subject matter described herein.

Figure 6:
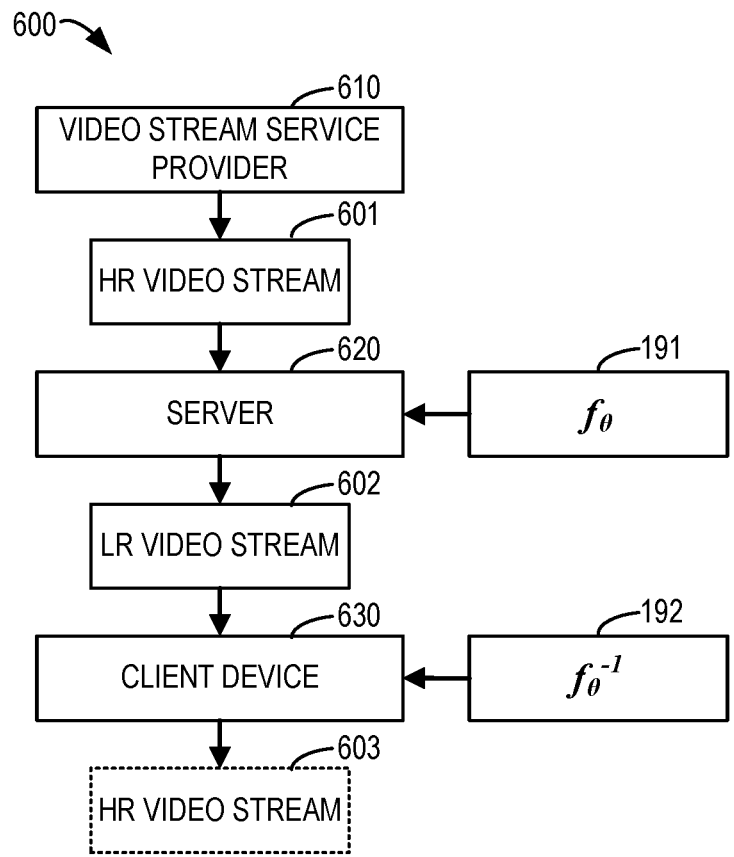
FIG. 6 illustrates a block diagram of an example system in which implementations of the subject matter described herein can be implemented.

FIG. 6 illustrates a block diagram of an example system 600 in which implementations of the subject matter described herein can be implemented. As shown, the system 600 may include a video stream service provider 610, a server 620 and a client device 630. For example, the video stream service provider 610 may provide video data requested by the client device 630 to the server 620 and the server 620 may send the video data from the video stream service provider 610 to the client device 630 via a network.

As shown in FIG. 6, in some implementations, the video stream service provider 610 may provide, to the server 620, a high-resolution video stream 601, which is also known as "high-resolution image sequence 601". The server 620 may convert, using the invertible neural network 191 as described above, the high-resolution image sequence 601 into a low-resolution image sequence. In some implementations, the server 620 may send the low-resolution image sequence as a low-resolution video stream 602 directly to the client device 630. In this case, the client device 630 may receive the low-resolution image sequence. Additionally or alternatively, in some implementations, the server 620 may perform video encoding on the low-resolution image sequence to generate an encoded low-resolution video stream 602 and send the encoded low-resolution video stream 602 to the client device 630 via the network. In this case, the client device 630 may decode the received encoded low-resolution video stream 602 to derive the decoded low-resolution image sequence. Then, the client device 630 may reconstruct, using the inverse network 192 of the invertible neural network 191, the derived low resolution image sequence into a high-resolution video stream 603. In this way, the clients can obtain high quality video streams while saving the network bandwidth.

In addition to the image and/or video processing fields, implementations of the subject matter described herein also can be applied to image and/or video storage fields. For example, before storing high-resolution images and/or videos into a storage device, the invertible neural network 191 as described above can be used to convert the high-resolution images and/or videos into low-resolution images and/or videos and corresponding high-frequency information following the predetermined distribution. Then, the derived low-resolution images and/or videos can be stored in the storage device while the corresponding high-frequency information can be discarded. In order to access the images and/or videos stored in the storage device, the low-resolution images and/or videos can be firstly obtained from the storage device. Then, the inverse network 192 of the invertible neural network 191 as described above can be used to reconstruct high-resolution images and/or videos based on the obtained low-resolution images and/or videos as well as random noises following the predetermined distribution. In this way, the storage space for storing images and/or videos can be saved without loss of quality of the images and/or videos.

Some example implementations of the subject matter described herein are listed below.

In a first aspect, the subject matter described herein provides a computer-implemented method. The method comprises: obtaining an input image of a first resolution; and generating, based on the input image and using a trained invertible neural network, an output image of a second resolution and high-frequency information following a predetermined distribution, wherein the first resolution exceeds the second resolution and the input image and the output image have the same semantics.

In some implementations, the method further comprises: storing the output image without storing the high-frequency information.

In some implementations, the method further comprises: encoding the output image; and providing the encoded output image.

In some implementations, the invertible neural network comprises a transformation module and at least one invertible network unit, and generating the output image and the high-frequency information comprises: decomposing, using the transformation module, the input image into a low-frequency component representing semantics of the input image and a high-frequency component related to the semantics; and generating, using the at least one invertible network unit, the output image and the high-frequency information independent of the semantics based on the low-frequency component and the high-frequency component.

In some implementations, the transformation module comprises any one of: a wavelet transformation module; and an invertible convolution block.

In some implementations, the method further comprises: training the invertible neural network, wherein the invertible neural network is trained to generate, based on a first image of the first resolution, a second image of the second resolution and first high-frequency information following the predetermined distribution; and an inverse network of the invertible neural network is trained to generate, based on a third image of the second resolution and second high-frequency information following the predetermined distribution, a fourth image of the first resolution.

In some implementations, training the invertible neural network comprises: obtaining a first group of training images of the first resolution; obtaining a second group of training images of the second resolution respectively corresponding to semantics of the first group of training images; and training the invertible neural network based on the first group of training images and the second group of training images.

In some implementations, obtaining the second group of training images comprises: generating, based on the first group of training images and using an interpolation method, the second group of training images.

In some implementations, training the invertible neural network comprises: determining a plurality of objective functions based on the first group of training images and the second group of training images; determining a total objective function for training the invertible neural network by combining at least a part of the plurality of objective functions; and determining network parameters of the invertible neural network by minimizing the total objective function.

In some implementations, determining the plurality of objective functions comprises: generating, based on the first group of training images and using the invertible neural network, a third group of training images of the second resolution and a group of random variables; and determining, based on differences between the second group of training images and the third group of training images, a first objective function.

In some implementations, determining the plurality of objective functions comprises: generating, based on the first group of training images and using the invertible neural network, a third group of training images of the second resolution and a group of random variables; generating, using the inverse network, a fourth group of training images of the first resolution based on the third group of training images and high-frequency information following the predetermined distribution; and determining, based on differences between the first group of training images and the fourth group of training images, a second objective function.

In some implementations, determining the plurality of objective functions comprises: determining a first data distribution of the first group of training images; determining a second data distribution of the fourth group of training images; and determining, based on a difference between the first data distribution and the second data distribution, a third objective function.

In some implementations, determining the plurality of objective functions comprises: determining a third data distribution of the group of random variables; and determining, based on a difference between the third data distribution and the predetermined distribution, a fourth objective function.

In a second aspect, the subject matter described herein provides a computer-implemented method. The method comprises: obtaining an input image of a second resolution; and generating, using a trained invertible neural network, an output image of a first resolution based on the input image and high-frequency information following a predetermined distribution, wherein the first resolution exceeds the second resolution and the input image and the output image have the same semantics.

In some implementations, obtaining the input image comprises: obtaining the encoded input image; and decoding the encoded input image.

In some implementations, the invertible neural network comprises a transformation module and at least one invertible network unit, and generating the output image comprises: generating, using the at least one invertible network unit, a low-frequency component and a high-frequency component to be combined based on the input image and the high-frequency information, wherein the low-frequency component represents semantics of the input image and the high-frequency component is related to the semantics; and combining, using the transformation module, the low-frequency component and the high-frequency component into the output image.

In some implementations, the transformation module comprises any one of: a wavelet transformation module; and an invertible convolution block.

In a third aspect, the subject matter described herein provides an electronic device. The electronic device comprises a processing unit; and a memory coupled to the processing unit and comprising instructions stored thereon which, when executed by the processing unit, cause the device to perform acts comprising: obtaining an input image of a first resolution; and generating, based on the input image and using a trained invertible neural network, an output image of a second resolution and high-frequency information following a predetermined distribution, wherein the first resolution exceeds the second resolution and the input image and the output image have the same semantics.

In some implementations, the acts further comprise: storing the output image without storing the high-frequency information.

In some implementations, the acts further comprise: encoding the output image; and providing the encoded output image.

In some implementations, the invertible neural network comprises a transformation module and at least one invertible network unit, and generating the output image and the high-frequency information comprises: decomposing, using the transformation module, the input image into a low-frequency component representing semantics of the input image and a high-frequency component related to the semantics; and generating, using the at least one invertible network unit, the output image and the high-frequency information independent of the semantics based on the low-frequency component and the high-frequency component.

In some implementations, the transformation module comprises any one of: a wavelet transformation module; and an invertible convolution block.

In some implementations, the acts further comprise: training the invertible neural network, wherein the invertible neural network is trained to generate, based on a first image of the first resolution, a second image of the second resolution and first high-frequency information following the predetermined distribution; and an inverse network of the invertible neural network is trained to generate, based on a third image of the second resolution and second high-frequency information following the predetermined distribution, a fourth image of the first resolution.

In some implementations, training the invertible neural network comprises: obtaining a first group of training images of the first resolution; obtaining a second group of training images of the second resolution respectively corresponding to semantics of the first group of training images; and training the invertible neural network based on the first group of training images and the second group of training images.

In some implementations, obtaining the second group of training images comprises: generating, based on the first group of training images and using an interpolation method, the second group of training images.

In some implementations, training the invertible neural network comprises: determining a plurality of objective functions based on the first group of training images and the second group of training images; determining a total objective function for training the invertible neural network by combining at least a part of the plurality of objective functions; and determining network parameters of the invertible neural network by minimizing the total objective function.

In some implementations, determining the plurality of objective functions comprises: generating, based on the first group of training images and using the invertible neural network, a third group of training images of the second resolution and a group of random variables; and determining, based on differences between the second group of training images and the third group of training images, a first objective function.

In some implementations, determining the plurality of objective functions comprises: generating, based on the first group of training images and using the invertible neural network, a third group of training images of the second resolution and a group of random variables; generating, using the inverse network, a fourth group of training images of the first resolution based on the third group of training images and high-frequency information following the predetermined distribution; and determining, based on differences between the first group of training images and the fourth group of training images, a second objective function.

In some implementations, determining the plurality of objective functions comprises: determining a first data distribution of the first group of training images; determining a second data distribution of the fourth group of training images; and determining, based on a difference between the first data distribution and the second data distribution, a third objective function.

In some implementations, determining the plurality of objective functions comprises: determining a third data distribution of the group of random variables; and determining, based on a difference between the third data distribution and the predetermined distribution, a fourth objective function.

In a fourth aspect, the subject matter described herein provides an electronic device. The electronic device comprises a processing unit; and a memory coupled to the processing unit and comprising instructions stored thereon which, when executed by the processing unit, cause the device to perform acts comprising: obtaining an input image of a second resolution; and generating, using a trained invertible neural network, an output image of a first resolution based on the input image and high-frequency information following a predetermined distribution, wherein the first resolution exceeds the second resolution and the input image and the output image have the same semantics.

In some implementations, obtaining the input image comprises: obtaining the encoded input image; and decoding the encoded input image.

In some implementations, the invertible neural network comprises a transformation module and at least one invertible network unit, and generating the output image comprises: generating, using the at least one invertible network unit, a low-frequency component and a high-frequency component to be combined based on the input image and the high-frequency information, wherein the low-frequency component represents semantics of the input image and the high-frequency component is related to the semantics; and combining, using the transformation module, the low-frequency component and the high-frequency component into the output image.

In some implementations, the transformation module comprises any one of: a wavelet transformation module; and an invertible convolution block.

In a fifth aspect, the subject matter described herein provides a computer program product being tangibly stored in a non-transitory computer storage medium and comprising machine-executable instructions which, when executed by a device, causing the device to perform the method according to the first aspect or the second aspect.

In a further aspect, the subject matter described herein provides a computer-readable medium having machine-executable instructions stored thereon which, when executed by a device, cause the device to perform the method according to the first aspect or the second aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter described herein has been described in language specific to structural features and/or methodological acts, it is to be understood that the subject matter described herein specified in the appended claims is not necessarily limited to the specific features or acts described above. Rather, the specific features and acts described above are disclosed as example forms of implementing the claims.

The invention claimed is:

1. A computer-implemented method, comprising:
obtaining an input image of a first resolution;
generating, based on the input image and using a trained invertible neural network, an output image of a second resolution and high-frequency information following a predetermined distribution,
wherein the first resolution exceeds the second resolution and the input image and the output image have the same semantics; and
training the invertible neural network, wherein training the invertible neural network comprises:
obtaining a first group of training images of the first resolution;
obtaining a second group of training images of the second resolution respectively corresponding to semantics of the first group of training images; and
training the invertible neural network based on the first group of training images and the second group of training images
determining a plurality of objective functions based on the first group of training images and the second group of training images;
determining a total objective function for training the invertible neural network by combining at least a part of the plurality of objective functions; and
determining network parameters of the invertible neural network by minimizing the total objective function.

2. The method of claim 1, wherein the invertible neural network comprises a transformation module and at least one invertible network unit, and generating the output image and the high-frequency information comprises:
decomposing, using the transformation module, the input image into a low-frequency component representing semantics of the input image and a high-frequency component related to the semantics; and
generating, using the at least one invertible network unit, the output image and the high-frequency information independent of the semantics based on the low-frequency component and the high-frequency component.

3. The method of claim 2, wherein the transformation module comprises any one of:
a wavelet transformation module; and
an invertible convolution block.

4. The method of claim 1, wherein:
the invertible neural network is trained to generate, based on a first image of the first resolution, a second image of the second resolution and first high-frequency information following the predetermined distribution; and
an inverse network of the invertible neural network is trained to generate, based on a third image of the second resolution and second high-frequency information following the predetermined distribution, a fourth image of the first resolution.

5. The method of claim 1, wherein obtaining the second group of training images comprises:
generating, based on the first group of training images and using an interpolation method, the second group of training images.

6. A computer-implemented method, comprising:
obtaining an input image of a first resolution;
generating, based on the input image and using a trained invertible neural network, an output image of a second resolution and high-frequency information following a predetermined distribution,
wherein the first resolution exceeds the second resolution and the input image and the output image have the same semantics; and
training the invertible neural network, wherein:
the invertible neural network is trained to generate, based on a first image of the first resolution, a second image of the second resolution and first high-frequency information following the predetermined distribution; and
an inverse network of the invertible neural network is trained to generate, based on a third image of the second resolution and second high-frequency information following the predetermined distribution, a fourth image of the first resolution;
wherein training the invertible neural network further comprises:
obtaining a first group of training images of the first resolution;
obtaining a second group of training images of the second resolution respectively corresponding to semantics of the first group of training images;
training the invertible neural network based on the first group of training images and the second group of training images;
determining a plurality of objective functions based on the first group of training images and the second group of training images;
determining a total objective function for training the invertible neural network by combining at least a part of the plurality of objective functions; and
determining network parameters of the invertible neural network by minimizing the total objective function.

7. The method of claim 6, wherein determining the plurality of objective functions comprises:
generating, based on the first group of training images and using the invertible neural network, a third group of training images of the second resolution and a group of random variables; and
determining, based on differences between the second group of training images and the third group of training images, a first objective function.

8. The method of claim 6, wherein determining the plurality of objective functions comprises:
generating, based on the first group of training images and using the invertible neural network, a third group of training images of the second resolution and a group of random variables;
generating, using the inverse network, a fourth group of training images of the first resolution based on the third group of training images and high-frequency information following the predetermined distribution; and
determining, based on differences between the first group of training images and the fourth group of training images, a second objective function.

9. The method of claim 8, wherein determining the plurality of objective functions comprises:
determining a first data distribution of the first group of training images;
determining a second data distribution of the fourth group of training images; and
determining, based on a difference between the first data distribution and the second data distribution, a third objective function.

10. The method of claim 8, wherein determining the plurality of objective functions comprises:
determining a third data distribution of the group of random variables; and
determining, based on a difference between the third data distribution and the predetermined distribution, a fourth objective function.

11. An electronic device comprising:
a processing unit; and
a memory coupled to the processing unit and comprising instructions stored thereon which, when executed by the processing unit, cause the device to perform acts comprising:
obtaining an input image of a first resolution;
generating, based on the input image and using a trained invertible neural network, an output image of a second resolution and high-frequency information following a predetermined distribution,
wherein the first resolution exceeds the second resolution and the input image and the output image have the same semantics; and
training the invertible neural network, wherein training the invertible neural network comprises:
obtaining a first group of training images of the first resolution;
obtaining a second group of training images of the second resolution respectively corresponding to semantics of the first group of training images; and
training the invertible neural network based on the first group of training images and the second group of training images
determining a plurality of objective functions based on the first group of training images and the second group of training images;
determining a total objective function for training the invertible neural network by combining at least a part of the plurality of objective functions; and
determining network parameters of the invertible neural network by minimizing the total objective function.

* * * * *